July 24, 1956  P. E. BUTZIN  2,756,133
MACHINE TOOL DRIVE MECHANISM
Filed April 8, 1955
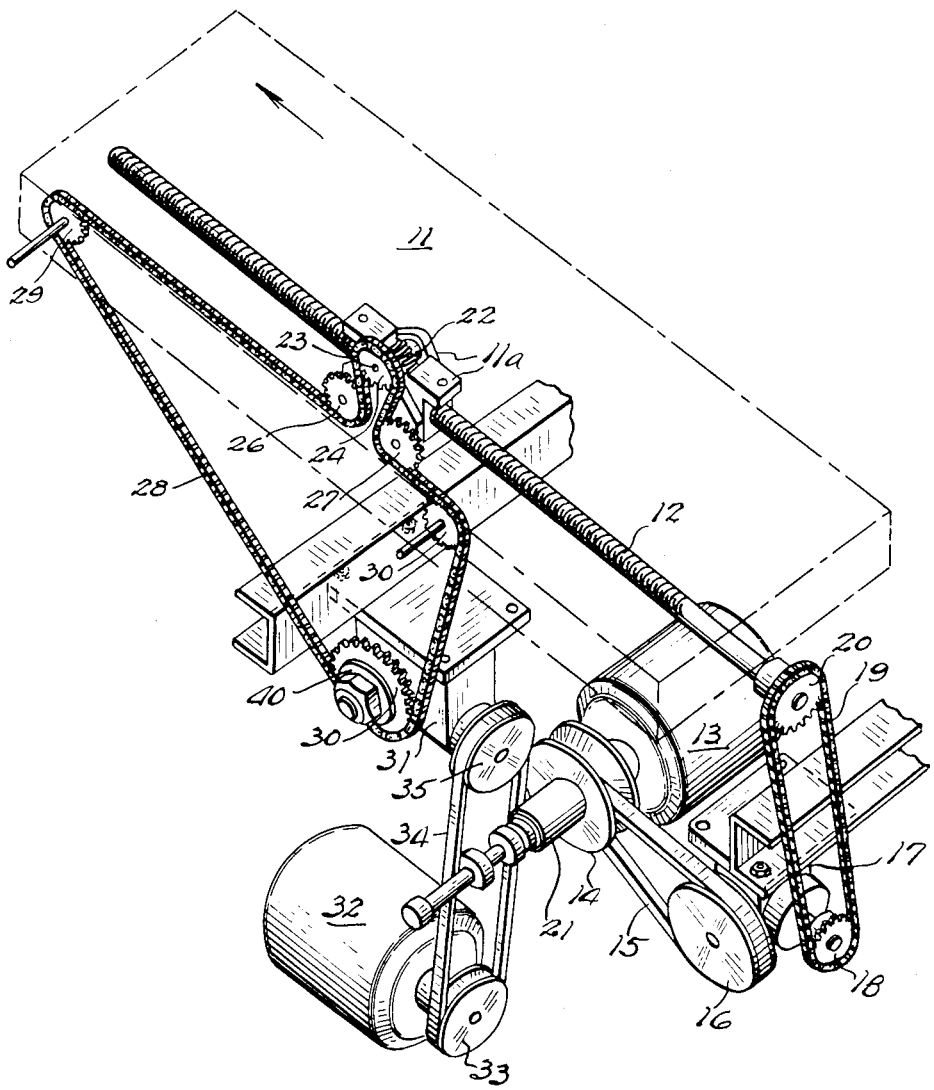
INVENTOR.
Paul E. Butzin.
BY
Thiess, Olson, Mecklenburger,
van Holst, + Ooltman  Attys.

United States Patent Office 2,756,133
Patented July 24, 1956

2,756,133

MACHINE TOOL DRIVE MECHANISM

Paul E. Butzin, Wauwatosa, Wis., assignor to Simplex Machine Tool Corporation, Milwaukee, Wis., a corporation of Wisconsin Application April 8, 1955, Serial No. 500,149

9 Claims. (Cl. 74—1)

This invention relates to a drive mechanism for moving a work table toward and away from a cutting tool, and it is an object of the invention to provide improved apparatus of that character.

In accordance with present practice, work tables for feeding material to cutting tools are commonly driven by hydraulic apparatus. Hydraulic apparatus has the characteristic of being very flexible in that it can readily be controlled to move the work table slowly and steadily toward the cutting tool and to move the work table rapidly away from the cutting tool after an operation has been completed. Hydraulic apparatus has the disadvantage, however, of being very expensive as compared to straight mechanical drive means.

In accordance with the present invention, a work table may be driven toward and away from a cutting tool by simple mechanical apparatus which is relatively inexpensive to manufacture and maintain, and which at the same time provides the desired flexibility.

Accordingly, it is another object of the invention to provide improved mechanical apparatus for driving a work table toward and away from a cutting tool.

It is another object of the invention to provide improved mechanical apparatus for driving a work table toward and away from a cutting tool, which apparatus while being inexpensive to manufacture and maintain, provides substantial flexibility in the operation of the work table.

This invention, together with further objects and advantages thereof, will best be understood by reference to the following description taken in connection with the accompanying drawing and its scope will be pointed out in the appended claims.

The single figure in the drawing is a perspective view of a machine tool work table and drive mechanism therefor illustrating one embodiment of the invention.

In the drawing a work table 11 is shown upon which work can be secured for movement in the direction of the arrow toward a cutting tool, not shown in the drawing. It will be understood that the cutting tool, toward and away from which the work table 11 moves, may be of any character and does not constitute a part of the present invention. More specifically, the cutting tool may be any tool capable of removing material in chips or particles, including drills and grinders. Preferably, the work table 11 and the cutting tool are mounted on a conventional base or frame, but may alternatively be supported in properly spaced relationship on a floor or other foundation. The work table 11 may be conventionally mounted on suitable slides or rollers and maintained in proper alignment by suitable guides, all as is well understood in the art.

A feed screw 12 is provided, whose principal function is to drive the work table 11 relatively slowly toward the cutting tool, for example in the direction of the arrow.

The screw 12 is driven by an electric motor 13, a pulley 14, a belt 15 and a second pulley 16, which is mounted on the input shaft of a gear box 17. On the output shaft of this gear box there is a sprocket 18 which drives a chain belt 19, which in turn drives a sprocket 20 secured to one end of the screw 12.

The purpose of the gear box 17 is, of course, to reduce the speed of rotation such that the screw 12 rotates much more slowly than the motor 13. Where variable speed of the screw is required, this can be obtained through the use of a variable speed coupling such as the pulleys 14 and 16, the belt 15 and a control device 21. Since variable speed coupling apparatus such as that suggested in the drawing is well known in the art and does not in itself constitute a feature of the present invention, it is not described in detail herein. It is believed to be sufficient for the purpose of the present disclosure to indicate that the control apparatus 21 may be operated to regulate the space between the two halves of the pulley 14, whereby the effective diameter of the pulley is varied.

The screw 12, the motor 13 and the gear box 17 are suitably mounted on the base or frame of the apparatus. The screw 12 is, of course, rotatable and is maintained against longitudinal movement, whereby rotation of the screw and engagement of the screw by apparatus on the table 11 causes the table to advance in one direction or another.

Mounted on the table 11 is a block 11a for supporting various gears including a worm gear 22. The block 11a has an opening with guide bearings through which the screw 12 passes, whereby the gear 22 and the screw 12 are held firmly in operative engagement. Alternatively, a second worm gear may engage the screw 12 on the side thereof opposite the worm gear 22 to maintain the screw firmly in operative engagement with gear 22. Such a second worm gear may idle or it may be drivingly connected to the worm gear 22. The worm gear 22 is rigidly secured through a shaft 23 to a sprocket 24, the shaft 23 being rotatably supported in the block 11a. A pair of idler sprockets 26 and 27 are also rotatably mounted on the block 11a.

A chain belt 28 engages these sprockets in the manner shown in the drawing, the belt passing under the idler sprocket 26, over the sprocket 24 and back under the other idler sprocket 27. It will, of course, be readily understood that the purpose of the idler sprockets 26 and 27 is to maintain the chain belt 28 in effective operative engagement with the spur sprocket 24.

The chain belt 28 extends adjacent the table 11 in its direction of travel and passes around additional idler sprockets 29 and 30 which are rotatably supported on the stationary frame of the apparatus through suitable bearings, not shown in the drawing.

Still further, the chain belt 28 engages a drive sprocket 30 on the output shaft of a gear box 31, the latter being driven by a motor 32, a pulley 33, a belt 34 and a second pulley 35 which is mounted on the input shaft of the gear box. The motor 32 and the gear box 31 are fixedly mounted on the base of the machine.

The operation of the apparatus described above will best be understood if consideration is first given to a hypothetical situation in which the worm gear 22 is held against rotation. In such a case the worm gear would act the same as a nut rigidly secured to the table 11, and if the screw 12 were to rotate, the table 11 would be advanced at a speed depending entirely upon the rate of rotation of the screw and the pitch of the threads.

Preferably, however, the worm gear 22 is not locked against rotation. Instead, the chain belt 28 is held stationary during the time that the table 11 is being advanced toward the cutting tool. This may be accomplished merely by deenergizing the motor 32 since the gearing in the gear box 31 is nonreversible. In such case, the upper edge of the sprocket 24 is held stationary, that is, the sprocket rolls along the bottom of the chain belt just as a wheel may roll along the ground. Accordingly, advancement of the worm gear 22 by the screw 12 causes the worm gear, and the sprocket 24, to rotate in a clockwise direction, the worm gear 22 retrogressing along the screw 12. The speed of the table 11 is thereby reduced as compared to the speed which would be obtained in the hypothetical case considered above. If the sprocket 24 and the worm gear 22 are of substantially the same diameter, as is contemplated in the preferred embodiment of the invention, the speed of the table 11 will be half of the speed which would be obtained if the worm gear 22 were locked against rotation. This is one operating condition of the disclosed apparatus and results in the table 11 advancing at a relatively slow speed. This operating condition is particularly adapted to use in feeding the work to the cutting tool. The speed of the table under this condition can, of course, be varied by manipulation of the control apparatus 21 for the variable speed coupling suggested above.

Suitable motor control apparatus including limit switches is preferably provided for starting, stopping, and reversing the two motors 13 and 32. Such controls are described briefly below, but for the purpose of describing the various operating conditions of the apparatus shown in the drawing it need be said only that such controls selectively start, stop, and reverse the two motors.

When it is desired to return the work table 11 to its withdrawn position, the motor 13 may be stopped and the motor 32 started in such a direction as to rotate the gear 24 in a clockwise direction. It will be apparent that with the screw 12 held stationary and the worm gear 22 rotating in a clockwise direction, the gear will roll along the screw and drive the table 11 to the right. Under these conditions the table 11 will travel at half of the speed of the chain belt 28, assuming that the sprocket 24 and the worm gear 22 are of substantially the same diameter. By selecting the speed of the motor 32 and the gear ratio in the gear box 31, the speed of the chain belt 28, and hence the speed of the work table 11 under this operating condition, can be made of any desired value.

If the screw 12 instead of being stopped is permitted to continue rotation in its original direction, it will be seen that the motor 13 will continue to provide a forward component of velocity to the work table while the motor 32 will provide a much larger reverse component of velocity. Accordingly the work table will withdraw from the machine tool proper at a velocity equal to the difference between these two components.

Still another operating condition is possible with the disclosed apparatus. This involves reversing the motor 13 so that the screw 12, operating in reverse, tends to withdraw the work table slowly from the machine tool proper. At the same time the motor 32 is started in such a direction as to withdraw the work table from the machine tool proper. The velocity of withdrawal will then be equal to the sum of the two components.

It will now be seen that the work table 11 can be driven in either direction at four different speeds. The highest speed is obtained when the two motors rotate in such a direction as to drive the work table in a common direction. A slower speed is obtained if the motor 13 is stopped and the motor 32 drives the work table in one direction or the other. A still slower speed is obtained if the two motors urge the table in opposite directions, and finally, a still slower movement of the table is obtained if the motor 32 is stopped and the motor 13 alone drives the table in one direction or the other. This order of relative table speeds is based, of course, on the preferred embodiment of the machine wherein the chain belt is arranged to drive the table much more rapidly than is the screw.

The apparatus for controlling the motors 13 and 32 may be of conventional and well known form and does not, in itself, constitute a feature of the present invention. Accordingly it is described herein only to the extent necessary to suggest various operating conditions of the apparatus shown in the drawing. The simplest form of control would involve a pair of limit switches. One such limit switch would start the motor 32 in such a direction as to withdraw the work table 11 after completion of the feeding cycle, the motor 13 continuing to rotate in its original direction or being stopped or reversed. The other limit switch would stop both motors at the end of the return stroke, or if repeated feeding means are desired, this second limit switch could be made to stop the motor 32 and to cause the motor 13 to drive the work table forward again.

It may be desired that the work table 11 advance in the forward direction to a very precise position, for example, when a hole is to be drilled or bored to a precise depth. Means are provided in the preferred embodiment of the invention for permitting the use of a mechanical stop for the work table 11 and thereby taking advantage of the greater accuracy obtainable by such stop means. This involves a friction clutch, preferably in the chain-belt drive. For example, the sprocket 30 may ride freely on its shaft and be frictionally engaged by a pair of plates 40 which are keyed to the shaft. By this expedient any desired limit of reasonable value can be placed on the force applicable to the sprocket 30 by the motor 32.

With the frictional clutch 30—40 incorporated in the chain-belt drive, an accurate mechanical stop for the table 11 may be employed. In this case, a limit switch is preferably positioned to be actuated by the advance of the work table at a point just short of the full forward movement of the work table; that is, the limit switch will be operated by the work table shortly before it strikes the mechanical stop. This limit switch can operate through a time delay device, well known in the art, whereby the motor 32 will not be energized until some time shortly after the table has advanced into engagement with the mechanical stop. Between the time that the work table engages the mechanical stop and the time that the motor 32 is energized to withdraw the work table, the screw 12 continues to urge the work table forward but the friction clutch 30—40 slips so that the worm gear 22 may rotate at any speed dictated by the screw 12, the work table remaining stationary. Since the gearing in the gear box 31 is nonreversible, the clutch will in fact slip, putting a determinable load on the drive under these circumstances.

Attention is directed to the fact that the speed of the work table in the four operating conditions described above can be predetermined by making the various elements of the apparatus of the desired speed, size, or ratio. For example, the speed of the motors 13 and 32 and the ratio of input speed and output speed of the gear boxes 17 and 31 may be preselected. Furthermore, the sprockets 18 and 20 and the pitch of the screw 12 may be preselected to obtain the desired basic speed of the work table when the motor 13 drives the screw 12. Also, the sprocket 30 may be of a selected size to give the desired speed to the chain belt 28 when the motor 32 is operating. Still further, the size of the sprocket 24 and the worm gear 22 with respect to each other may be selected to obtain desired speeds under various of the operating conditions of the apparatus.

While a chain belt 28 is recommended for driving and controlling the sprocket 24, it will be apparent that other means, such as a flat belt or a V belt, may be employed.

According to the preferred embodiment of the invention, the motors 13 and 32 are identical and the gear boxes 17 and 31 are identical in order to provide greater flexibility and simplicity in storing spare parts and in maintaining the machine.

It will be apparent that the two idler sprockets 29 and 30 should be spaced beyond opposite ends of the maximum travel of the idler sprockets 26 and 27 as the work table is driven back and forth.

It will now be seen that a machine tool drive mechanism has been disclosed which provides all desired flexibility of operation. Basically, the work table can be moved forward at a speed selected in the design of the machine, and variable, if desired, by a variable speed coupling, and the table can be moved in the reverse direction at a speed which need have no relationship to the forward speed. Furthermore, the speed of withdrawal can be made greater or smaller than normal by operating the screw to add to or subtract from the normal speed. This flexibility of operation is obtained mechanically, rather than by relatively costly hydraulic apparatus.

While particular embodiments of the invention have been shown, it will be understood, of course that the invention is not limited thereto since many modifications may be made, and it is, therefore, contemplated to cover by the appended claims any such modifications as fall within the true spirit and scope of the invention.

The invention having thus been described, what is claimed and desired to be secured by Letters Patent is:

1. In a drive mechanism for moving a work table toward and away from a cutting tool, a motor driven screw, a worm gear rotatably mounted on the table and movable therewith as a unit and operatively engaging said screw, a drive wheel rotatably mounted on the table and drivingly connected to said worm gear, and power driven flexible means operatively connected to said drive wheel and operable in a plane substantially parallel to the axis of said screw, said means when held stationary restraining said drive wheel and causing said worm gear to retrogress along said screw as said screw turns, said means when driven causing said worm gear to roll along said screw.

2. In a drive mechanism for moving a work table toward and away from a cutting tool, a motor driven screw, a worm gear rotatably mounted on the table and movable therewith as a unit and operatively engaging said screw, a sprocket rotatably mounted on and carried by the table and drivingly connected to said worm gear, and a motor driven chain belt meshing with said sprocket and operable in a plane substantially parallel to the axis of said screw, said chain when held stationary effecting retrogression of said worm gear along said screw upon rotation of the latter, said chain when driven causing said worm gear to roll along said screw.

3. In a drive mechanism for moving a work table toward and away from a cutting tool, a motor driven screw rotatably mounted on a fixed base and restrained against longitudinal movement, a worm gear rotatably mounted on and carried by the table and operatively engaging said screw, a sprocket rotatably mounted on and carried by the table and coaxial with and drivingly connected to said worm gear, a motor driven chain belt operatively connected to said sprocket and operable in a plane substantially parallel to the axis of said screw, and a pair of relatively spaced idler sprockets rotatably mounted on a fixed base and engaged by said chain belt, said idler gears being arranged beyond opposite ends of the travel of said first-mentioned sprocket, said chain, when held stationary, restraining said first-mentioned sprocket and causing said worm gear to retrogress along said screw as said screw turns, and, when driven by said chain, causing said worm gear to roll along said screw.

4. In a drive mechanism for moving a work table toward and away from a cutting tool, a motor driven screw rotatably mounted on a fixed base and restrained against longitudinal movement, a worm gear rotatably mounted on and carried by the table and operatively engaging said screw, a first sprocket carried by the table and coaxial with and drivingly connected to said worm gear, a motor driven chain belt extending adjacent the table in a plane substantially parallel to the axis of said screw, a pair of second idler sprockets carried by the table and disposed adjacent said first sprocket and in engagement with said belt to maintain the latter in meshing engagement with said first sprocket, and a pair of relatively spaced third idler sprockets rotatably mounted on a fixed base and engaged by said chain belt, said third idler sprockets being arranged beyond opposite ends of travel of said first sprocket and said second idler sprockets, said chain belt, when held stationary, restraining said first sprocket and causing said worm gear to retrogress along said screw as said screw turns, and, when driven, causing said worm gear to roll along said screw.

5. In a drive mechanism for moving a work table toward and away from a cutting tool, an elongated motor driven screw rotatably mounted on a fixed base and restrained against longitudinal movement, a gear supporting block carried by the table, a worm gear rotatably mounted on said block and in meshing engagement with said screw, said block having means for receiving said screw and holding the latter in meshing engagement with said worm gear, a first sprocket rotatably mounted on said block and coaxially spaced and drivingly connected to said worm gear, a motor driven chain belt operable in a plane substantially parallel to the axis of said screw, a pair of idler sprockets rotatably mounted on and carried by said block in spaced relation with said first sprocket, said chain belt passing over said first sprocket and said pair of second idler sprockets and being maintained by the latter in meshing engagement with said first sprocket, and a pair of third idler sprockets rotatably mounted on a fixed base and engaged by said chain belt, said third idler sprockets being arranged in relatively spaced relation and disposed beyond opposite ends of travel of said first sprocket and said pair of second idler sprockets, said chain, when held stationary, restraining said first-mentioned sprocket and causing said worm gear to retrogress along said screw as said screw turns, said chain, when driven, causing said worm gear to roll along said screw.

6. In a drive mechanism for moving a work table toward and away from a cutting tool, an elongated motor driven screw, a worm gear rotatably mounted on and carried by the table and in meshing engagement with said screw, a sprocket rotatably mounted on and carried by the table and drivingly connected to and axially spaced from said worm gear, and a motor driven chain belt extending adjacent said table and operable in a plane substantially parallel to said screw axis and in meshing engagement with said sprocket, said chain, when driven, causing said worm gear to roll along said screw, and, chain when held stationary, restraining said sprocket and causing said worm gear to retrogress along said screw as said screw turns, said sprocket and said worm gear being of substantially the same diameter whereby such retrogression of said worm gear along said screw causes said table to advance at half the speed obtainable if said worm gear were locked against rotation.

7. In a drive mechanism for moving a work table toward and away from a cutting tool, an elongated power driven screw rotatably mounted on a fixed base and restrained against longitudinal movement, a worm gear rotatably mounted on and carried by the table and in meshing engagement with said screw, drive means rotably mounted on and carried by the table in coaxial relation with said worm gear and drivingly connected thereto, a power driven belt operatively connected to said drive means and operable in a plane substantially parallel to said screw axis, said belt, when driven, causing said worm gear to roll along said screw, said belt, when held stationary, restraining said drive means and causing said worm gear to retrogress along said screw as said screw turns, and a friction clutch operatively connected to said drive means whereby said belt may slip and permit said worm gear to retrogress along said screw at any speed dictated by said rotating screw when the table is physically restrained against movement.

8. In a drive mechanism for moving a work table toward and away from a cutting tool, a motor driven screw, a variable speed coupling arranged in the drive means for said screw, a worm gear rotatably mounted on and carried by the table and in meshing engagement with said screw, a rotatable drive wheel carried by the table and drivingly connected to and coaxial with said worm gear, and a motor driven belt operatively connected to said drive wheel and operable in a plane substantially parallel to the axis of said screw, said belt when held stationary restraining said drive wheel and causing said worm gear to retrogress along said screw as said screw turns, said belt when driven causing said worm gear to roll along said screw.

9. In a drive mechanism for moving a work table toward and away from a cutting tool, a motor driven screw rotatably mounted on a fixed base and restrained against longitudinal movement, a variable speed coupling arranged in the drive means for said screw, a rotatable worm gear carried by the table and operatively engaging said screw, a rotatable sprocket carried by the table in co- axial relation with said worm gear and drivingly connected to the latter, a motor driven chain belt disposed adjacent said table and operable in a plane substantially parallel to the axis of said screw to rotate said sprocket, said chain, when driven, causing said worm gear to roll along said screw, said chain, when held stationary, restraining said sprocket and causing said worm gear to retrogress along said screw as said screw turns, and a friction clutch arranged in the drive means for said chain belt whereby said chain belt may slip and permit said worm gear to retrogress along said screw at any speed dictated by said rotating screw when said table is physically restrained against movement.

References Cited in the file of this patent

UNITED STATES PATENTS

| | | |
|---|---|---|
| Re. 23,642 | Baker | Apr. 14, 1953 |
| 2,514,350 | Pianta | July 4, 1950 |
| 2,548,847 | Rossmann | Apr. 10, 1951 |